United States Patent [19]
Hollis et al.

[11] Patent Number: 5,793,499
[45] Date of Patent: Aug. 11, 1998

[54] FAX STATUS STAMP ON BACK OF DOCUMENT

[75] Inventors: Jennie L. Hollis, Olivenhain; Dan S. Caputo, San Diego, both of Calif.

[73] Assignee: Hewlett-Packard Company, Palo Alto, Calif.

[21] Appl. No.: 730,646

[22] Filed: Oct. 11, 1996

[51] Int. Cl.$^6$ ........................................ H04N 1/00
[52] U.S. Cl. ................................ 358/439; 358/405
[58] Field of Search .................... 358/405, 439, 358/496, 400

[56] References Cited

U.S. PATENT DOCUMENTS 4,908,714  3/1990  Iriyama et al. .................. 358/405
5,497,250  3/1996  Kawashima ...................... 358/498

FOREIGN PATENT DOCUMENTS 58-029262  2/1983  Japan .................... H04N 1/02
5-022490   1/1993  Japan .................... H04N 1/00

*Primary Examiner*—Edward L. Coles
*Assistant Examiner*—Kimberly A. Williams
*Attorney, Agent, or Firm*—Manuel Quiogue

[57] ABSTRACT

An ink jet hardcopy facsimile apparatus having an automatic document feeder, a scanning station and print station, wherein a facsimile status marking indicative of facsimile condition is printed on the non-scanned side of a document after the document is scanned.

4 Claims, 3 Drawing Sheets

FAX STATUS STAMP ON BACK OF DOCUMENT

BACKGROUND OF THE INVENTION

The disclosed invention is directed generally to hardcopy facsimile machines, and more particularly to a hardcopy facsimile machine that prints an operational status marking on the back of a source document that has been scanned by the facsimile machine.

Hardcopy facsimile machines are extensively used to electronically communicate documents. Typically, it is desired that a record be made indicating that a document has been sent. This has been achieved by manually marking a document after it has been ejected from the scanner of a facsimile machine, or by a stamping mechanism that has been built into some facsimile machines. The stamping mechanism can include an ink reservoir, a rubber stamp, and a stamp actuating mechanism.

A consideration with facsimile machine stamping mechanisms include complexity, the inability of a stamp to indicate successful receipt or error, and stamping the front of the scanned document.

SUMMARY OF THE INVENTION

It would therefore be an advantage to provide a facsimile status marking apparatus of reduced complexity.

Another advantage would be to provide a facsimile status marking apparatus that provides a marking which indicates the status of a scanned document.

A further advantage would be to provide a facsimile status marking apparatus that places a status marking on the back of a scanned document.

The foregoing and other advantages are provided by the invention in a method that includes the steps of advancing a document through a scanning station; scanning a front side of the document to produce facsimile data; transmitting the facsimile data to a remote terminal; waiting for status response from the remote terminal regarding receipt of the facsimile data; and printing a facsimile status condition marking. The method is preferably implemented in an ink jet hardcopy apparatus having scanning and printing capabilities.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
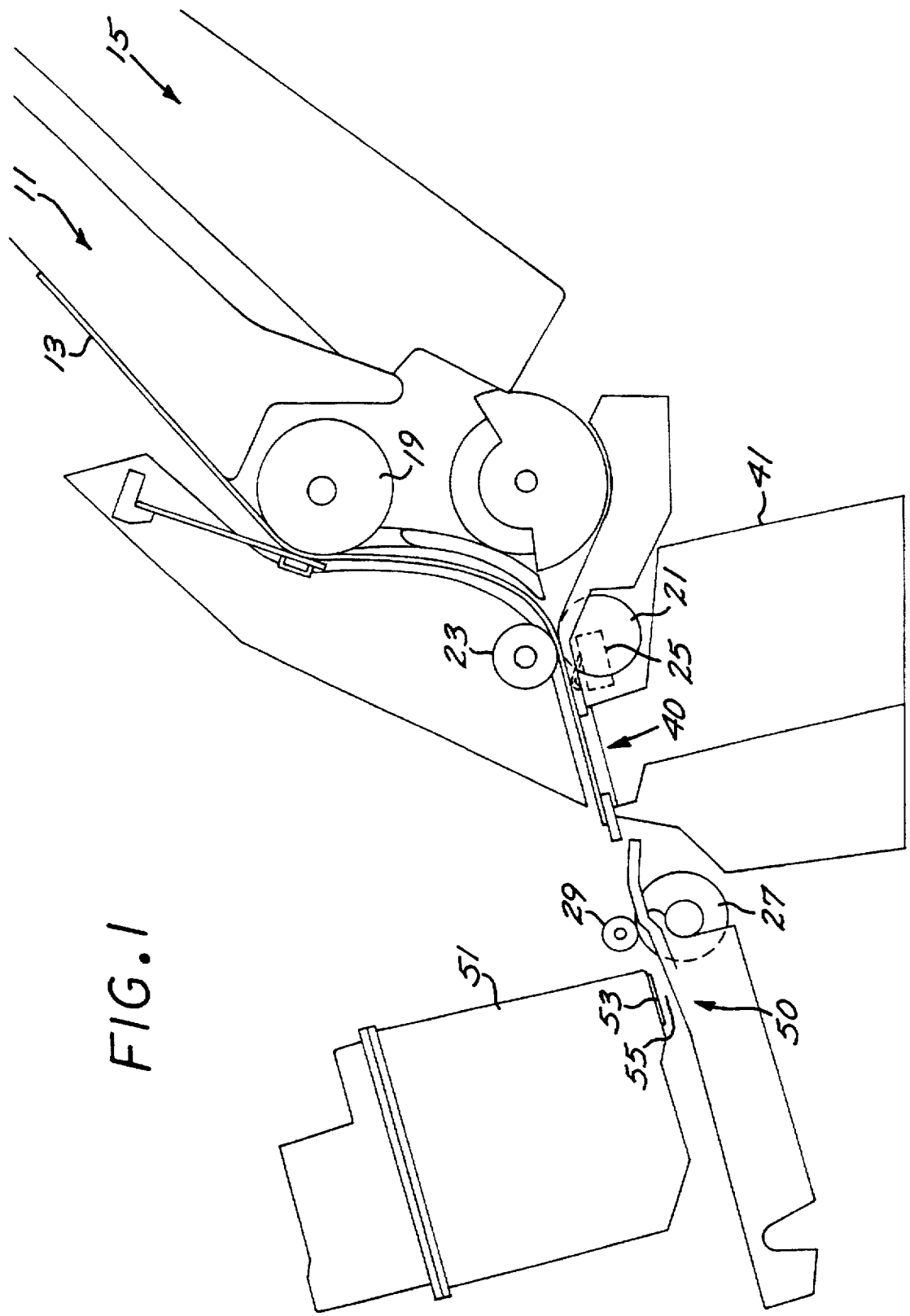
FIG. 1 schematically sets forth a side elevational view of a hardcopy facsimile machine that implements facsimile status marking in accordance with the invention.

In the following detailed description and in the several figures of the drawing, like elements are identified with like reference numerals.

Referring now to FIG. 1, schematically set forth therein is a side elevational view of a hardcopy facsimile machine that implements facsimile status stamping in accordance with the invention. This hardcopy facsimile machine is a multi-function device of type disclosed in commonly assigned U.S. Pat. No. 5,391,009, incorporated herein by reference, and in commonly assigned application Ser. No. 08/585,058, filed Jan. 11, 1996, incorporated herein by reference.

The hardcopy facsimile machine of FIG. 1 generally includes an automatic document feeder (ADF) 11 for accepting documents 13 that are to be individually moved through a scanning station 40 and a print station 50. An automatic sheet feeder (ASF) 15 accepts printout sheets (not shown) that are to be individually moved through the scanning station 40 and the print station 50. Documents 13 moved through the scanning station 40 are scanned via a scanner 41, while printout sheets moved through the scanning station 40 are not scanned.

The print station 50 includes an ink jet pen 51 which is reciprocatingly driven along a carriage scan axis that is orthogonal to the plane of FIG. 1. The ink jet pen 51 includes an ink jet printhead 53 that is controlled to emit ink drops in a print zone 55 which is effectively a narrow band that extends orthogonally to the plane of FIG. 1. Printing is therefore effected on the upward facing side of a document 13 or sheet in the print zone 50. In accordance with the invention, documents 13 are marked with a fax status marking after being scanned. The ink jet pen 51 comprises a black printing pen or a multiple color printing pen. Multiple ink jet pens can also be utilized.

A document 13 in the ADF 11 is individually picked by a pick roller 19 which advances the document to a pre-scan roller 21 and a pre-scan pinch wheel 23 which cooperate to advance the document 13 through the scanning station 40. A document detecting switch 25 is located adjacent the pre-scan roller for detecting the leading edge of the a document 13 as it emerges from between the roller 21 and the pinch wheel 23. By way of illustrative example, the roller 21 and the pinch wheel 23 are segmented, and the switch 25 is located between segments of the roller 21. The switch 25 also detects the trailing edge of a document 13 when the document is clear of the roller 21 and the pinch wheel 23.

After a document 13 advances past the scanning station 40, a pre-printing roller 27 and a pre-printing pinch wheel 29 cooperate to advance a document 13 through the print station 50. The pre-scan roller 21 and the pre-printing roller 27 are driven in unison by a gear system that in turn is driven by a media drive motor, for example in a conventional manner. Thus, a document 13 is advanced through the scanning station 40 and then through the print station 50.

Figure 2:
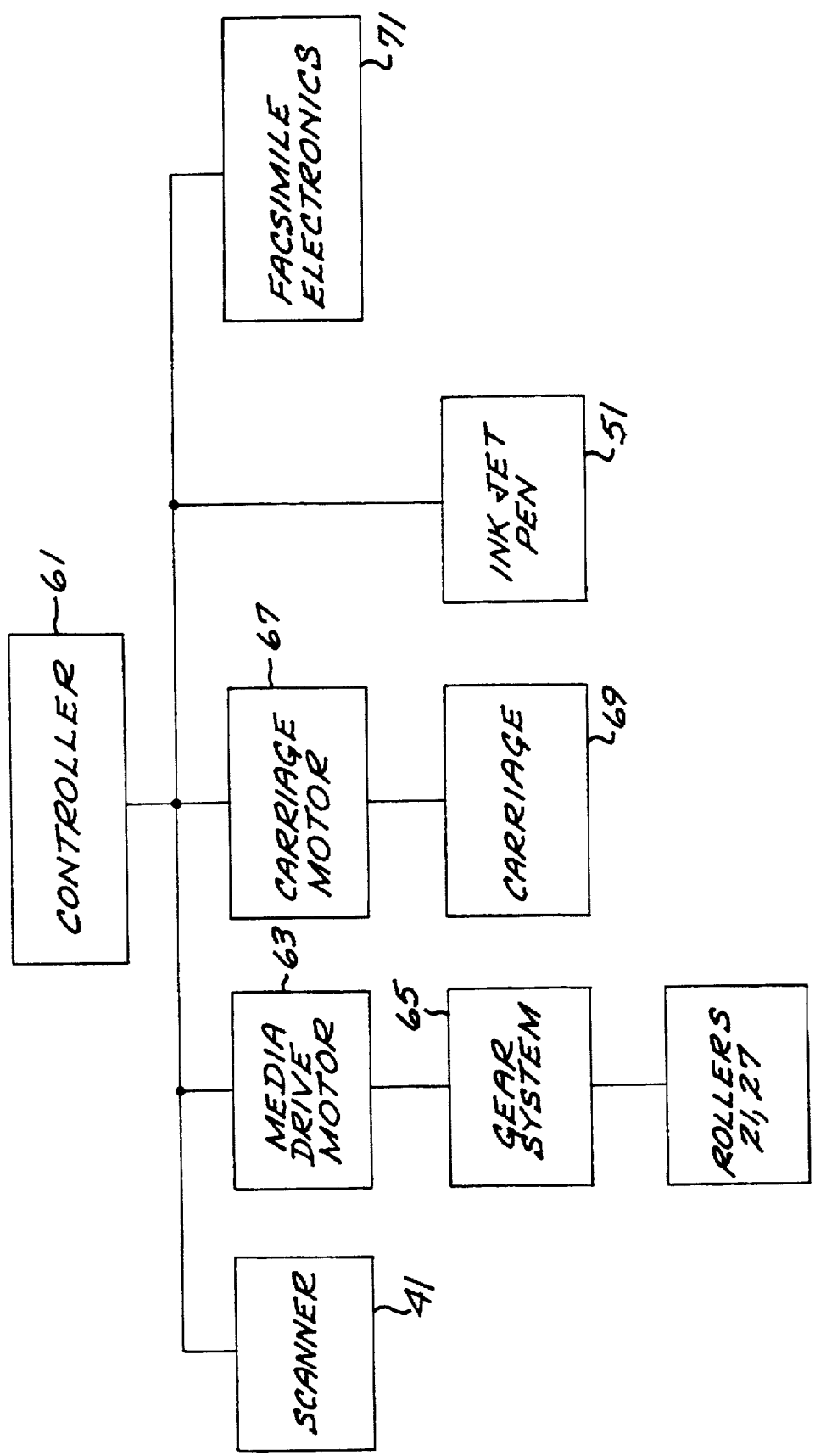
FIG. 2 is a simplified block diagram of a printer controller for controlling the swath printer of FIG. 1.

Referring now to FIG. 2, set forth therein is a simplified block diagram of a control system for controlling the hardcopy facsimile machine of FIG. 1 in which the techniques of the invention can be implemented. The control system includes a microprocessor based controller 61 which controls the scanner 41, the firing of the pen 51, and a media drive motor 63 that drives the rollers 21, 27 (FIG. 1) via a gear system 65. The controller 61 further controls a print carriage motor 67 that reciprocatingly moves a print carriage 69 which supports the pen 51. Facsimile electronics 71 control the sending and receiving of facsimile data.

Figure 3:
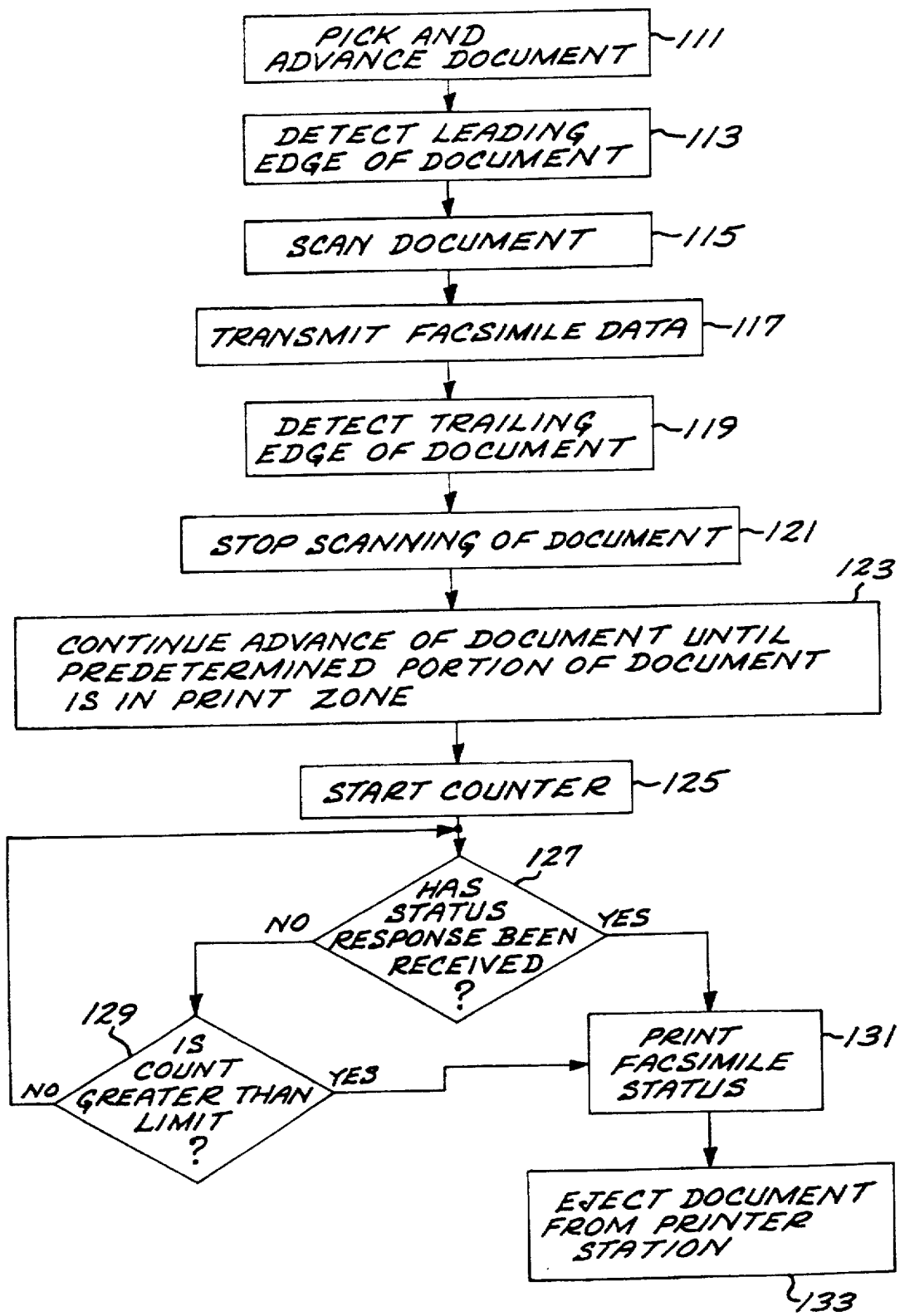
FIG. 3 schematically sets forth a flow diagram of a facsimile status marking procedure in accordance with the invention.

Referring now to FIG. 3, schematically set forth therein is a flow diagram of a procedure that implements fax status condition stamping in accordance with the invention. At 111 a document 13 is picked and advanced to the pre-scan roller 21 and pinch wheel 23 which continue to advance the document 13. At 113 the switch 25 detects the leading edge of the document, and at 115 scanning is effected after the document has been advanced by a predetermined amount after detection of the leading edge. Facsimile data is produced pursuant to the scanning, and at 117 the facsimile data is transmitted to a remote terminal, for example while scanning continues.

At 119 the trailing edge of the document 13 is detected by the switch 25, and at 121 scanning is stopped after the document has been advanced a predetermined amount after detection of the trailing edge. At 123 advance of the document is continued until a desired portion of the document is in the print zone 55 of the print station 50. For example, the document is advanced so as to position in the print zone 55 a portion of the document that is adjacent the trailing edge of the document.

At 125 a counter is started, and at 127 a determination is made as to whether a status response has been received from the remote terminal regarding the transmitted facsimile data. If no, at 129 a determination is made as to whether the count output of the counter is greater than a predetermined limit. If the determination at 129 is yes, control transfers to 131 for printing of a marking indicative of facsimile status on the back side of the document 13. If the determination at 129 is no, control transfers to 127. If the determination at 127 is yes, indicating that a status response has been received from the remote terminal, control transfers to 131 for the printing of a facsimile status marking.

By way of illustrative example, different predetermined patterns are utilized to indicate different status conditions such as (a) no response received (i.e., when it is determined at 129 that a predetermined wait period for response has timed out), (b) a page has been received with an acceptable error rate (e.g., 10% or less), and (c) a page has been received with a high error rate. The status condition of no response can be indicated by an X in a circle, while the status condition for received with an acceptable error rate can be indicated by an OK in a circle. The status condition of received with a high error rate can be indicated by a questions mark (?) in a circle. Alternatively, the status condition of no response can be indicated by the absence of a marking. As a further alternative, the status condition of received with an acceptable error rate can be indicated by a predetermined marking while the other status conditions are indicated by an absence of a marking. Also, different colors and/or color patterns can be utilized to indicate different status conditions.

The foregoing has thus been a disclosure of a facsimile status marking apparatus that places a facsimile status condition marking on the back of a scanned document, and which is advantageously implemented with minimal additional parts.

Although the foregoing has been a description and illustration of specific embodiments of the invention, various modifications and changes thereto can be made by persons skilled in the art without departing from the scope and spirit of the invention as defined by the following claims.

What is claimed is:

1. A method of processing a document in a facsimile hardcopy machine having a scanning station and a printing station, the method comprising the steps of:

advancing the document through the scanning station;

scanning a front side of the document to produce facsimile data;

transmitting the facsimile data to a remote terminal;

waiting for a status response from the remote terminal of receipt of the facsimile data; and printing on a back side of the document a facsimile status marking having a first pattern if a status response indicating receipt with an acceptable error rate was received;

printing on the back side of the document a facsimile status marking having a second pattern if a status response indicating receipt with a high error rate was received; and printing on the back side of the document a facsimile status marking having a third pattern if no status response was received.

2. A facsimile hardcopy machine comprising:

a scanning station;

a printing station;

means for advancing a document through the scanning station;

means for scanning a front side of the document to produce facsimile data;

means for transmitting the facsimile data to a remote terminal;

means for advancing the document through the print station; and means for printing a facsimile status marking on a back side of the document, wherein (a) the facsimile status marking includes a first pattern if a status response indicating receipt with an acceptable error rate was received, (b) the facsimile status marking includes a second pattern if a status response indicating receipt with a high error rate was received, and (c) the facsimile status marking includes a third pattern if no status response was received.

3. The facsimile hardcopy machine of claim 2 wherein said means for printing includes an ink jet cartridge.

4. The facsimile hardcopy machine of claim 2 wherein said means for printing further includes a scanning carriage.

* * * * *